June 10, 1969     G. N. J. MEAD     3,449,199

HELICAL REINFORCED MATERIALS AND METHOD OF MAKING SAME

Filed Feb. 13, 1964

INVENTOR.
GEORGE N. J. MEAD
BY
Morse & Altman
ATTORNEYS

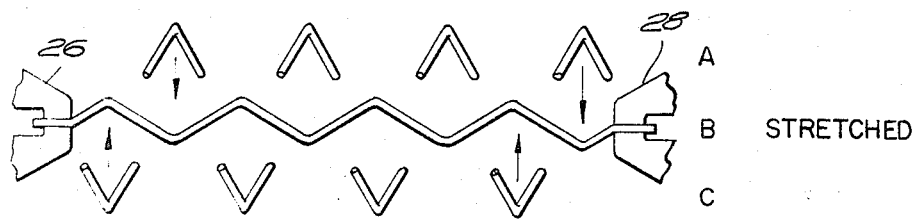
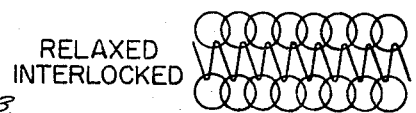
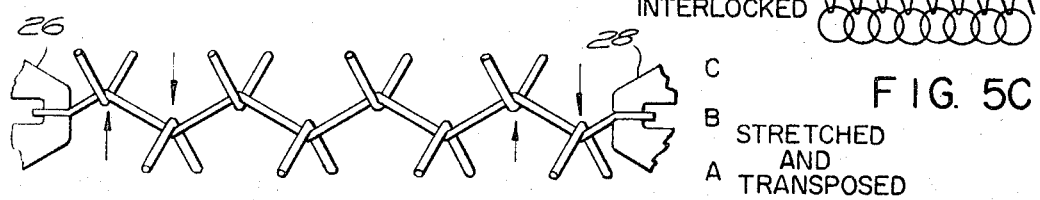
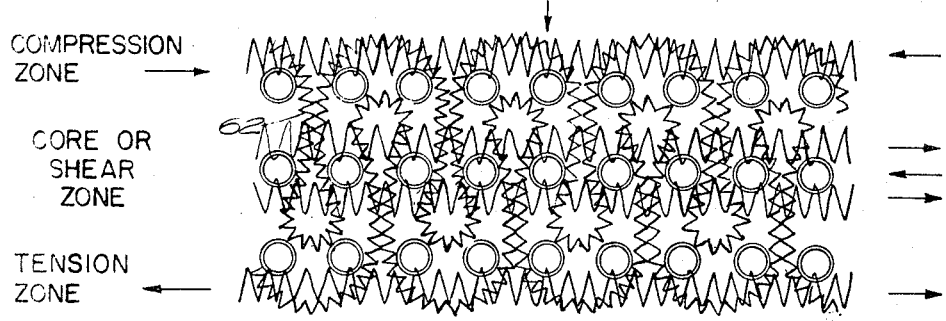
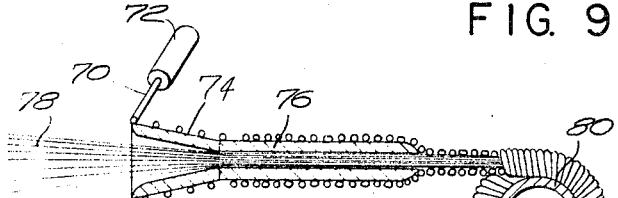
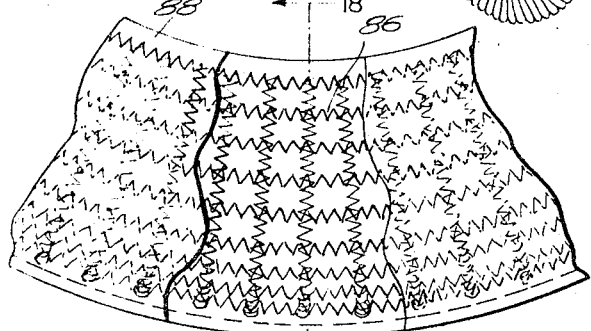
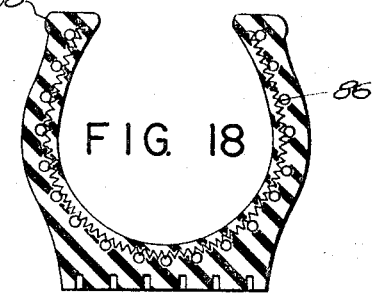

United States Patent Office 3,449,199
Patented June 10, 1969

3,449,199
HELICAL REINFORCED MATERIALS AND
METHOD OF MAKING SAME
George N. J. Mead, 5 Robin Lane,
Exeter, N.H. 03833
Filed Feb. 13, 1964, Ser. No. 344,637
Int. Cl. B32b 7/04, 5/12, 3/00
U.S. Cl. 161—47                    4 Claims

ABSTRACT OF THE DISCLOSURE

Laminated plastic structures are reinforced by means of helical elements disposed internally of the structure in parallel groups to provide mechanical interlocking with a matrix and increase the bonding surface area between the matrix and the elements. The helical reinforcing fibers cooperate with the matrix to form a tough composite structure capable of absorbing large amounts of energy both plastically and elastically during tensile or compression loading.

---

This invention relates generally to reinforced materials and more particularly is directed towards new and improved internally reinforced laminated products including novel methods for fabricating the same.

Reinforced laminates of various types are finding an increased number of applications because of advantageous strength-to-weight ratios and other desirable characteristics. Fiberglass reinforced plastics, for example, enjoy a high strength-to-weight ratio and are frequently employed for such purposes as boat hulls, body sections of automobiles and numerous other uses. Other similar types of reinforced products include metal wires in the form of strands or meshes encapsulated in a rubber matrix for use in tires, drive belts, etc. In the case of plastics, normally these laminates are shapes containing reinforcing materials such as fibers, cloth, paper or the like and in practice are made of several layers of plastic impregnated cloth or paper bonded together in a suitable plastic matrix which is cured to form a continuous phase surrounding the fibers. Mats of fibers may be employed in place of cloth or paper.

While fiberglass reinforced plastic is characterized by an excellent strength-to-weight ratio, the material has not found as broad an acceptance as might be expected because existing products have been lacking in toughness. The term, toughness in this context refers to a material's ability to deform elastically up to its elastic limit and also its ability to deform plastically beyond its elastic limit. In other words, it characterizes the ability of a particular material to absorb energy before complete failure. This characteristic of a material is of great significance when selecting materials for structural applications.

In general, laminated composites such as fiberglass reinforced plastics have suffered from a number of persistent problems, which include poor bonding between the fiberglass and the matrix, high shrinkage of the matrix during cure, little or no interlocking between laminations and inability of the glass fibers to stretch to any appreciable extent. The glass fibers have good resiliency, but little or no capacity to absorb energy plastically prior to complete failure. As a result, fiberglass reinforced plastics tend to fail in a catastrophic fashion under excessive loadings.

Accordingly, it is an object of the present invention to provide improvements in reinforced structures, both stiff and flexible such as fiberglass reinforced plastics, rubber drive belts, tires and the like.

Another object of this invention is to increase the toughness of reinforced laminates.

Yet another object of this invention is to improve the mechanical characteristics of fiberglass reinforced plastics.

A still further object of this invention is to provide a novel method for fabricating reinforced laminates.

More particularly, this invention features a reinforced laminate in which the reinforcements are relatively stiff spiral elements. As applied to reinforced plastics, fiberglass elements are formed in a spiral configuration and a number of spiral filaments arranged parallel to one another in one embodiment, and in another embodiment the filaments are arranged at right angles to one another. The helical form of the reinforcing filaments provides mechanical interlocking with the matrix and increases the bonding surface area between the matrix and the filament. The helical reinforcing fibers cooperate with the matrix to form a tough composite structure capable of absorbing large amounts of energy both plastically and elastically during tensile or compression loading. The helical fibers greatly enhance the shear modulus of the composition and the flexural modulus as well.

But these and other features of the invention, along with further objects and advantages thereof, will become more readily apparent from the following detailed description of the invention, with reference being made to the accompanying drawings, in which:

FIGS. 5A, 5B and 5C are side views somewhat schematic showing the apparatus and technique for fabricating an interlocked core;

FIG. 9 is a cross sectional view of a composite structure made according to the invention;

FIG. 15 is a schematic side elevation partly in section showing apparatus for forming spiral elements;

FIG. 16 is a sectional side view of a reinforced belt;

FIG. 17 is a fragmentary side elevation partly broken away showing a reinforcing tire; and FIG. 18 is a cross-sectional view taken along the line 18—18 of FIG. 17.

Figure 1:
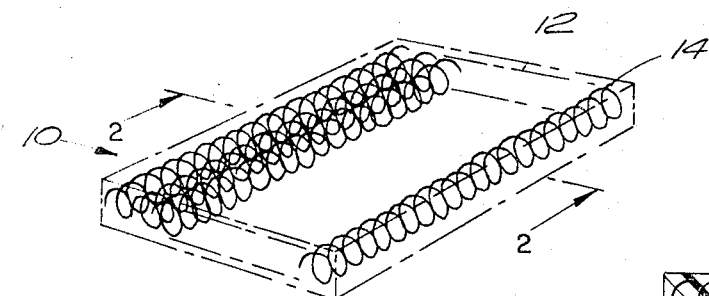
FIG. 1 is a phantom view in perspective of a reinforced panel made according to the invention but showing only a few sets of reinforcing elements for the sake of clarity.
Figure 2:
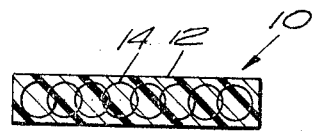
FIG. 2 is a cross sectional view taken along the line 2—2 of FIG. 1.

Referring now to the drawings and to FIG. 1 in particular, the reference character 10 generally indicates a composite body in the form of a panel comprising a matrix 12 and a plurality of helical reinforcing elements 14 arranged parallel to one another lengthwise of the panel and with the convolutions of adjacent elements meshing to a slight extent with one another as best shown in FIG. 2. In a preferred form of this invention, the matrix 12 is a plastic material of the sort commonly used in laminates such as epoxy resins, phenolics and polyesters. In general, different resins that cure to plastics are used in various modifications depending upon the kind of laminating material. In common use are polyesters dissolved in a monomer such as styrene. These require a catalyst just before use and may be cured at room temperature, while epoxy resins and phenolics require heating in ranges from 200 to 350°, for example, in order to be cured.

In any event, the matrix 12 is a suitable plastic material and the reinforcing elements 14 in the preferred form are fabricated from fiberglass or a comparable material. Each element is a helical cylindrical spring and extends the full length of the matrix as illustrated. Other arrangements may also be provided as will be disclosed more fully below. In general, the helical elements 14 should be relatively stiff so the ratio of coil diameter to wire diameter should be on the order of 4:1. The helices should be relatively open having at least one wire diameter between convolutions and at most a helix angle of 45°. Typically, the coil diameters should range from approximately 1/16" to 1/8" and will therefore require wire diameters in the range for about .015" to .035".

The use of cylindrical helical springs as reinforcing elements in fiberglass reinforced plastic structures provide a number of advantages not available to other types of reinforcing mediums. For example, the helical form on the fiberglass elements provides a positive mechanical bond or lock with the matrix 12 such that even if the surface bond (that bond between the interfacing of the matrix and the fiber) is imperfect, there still exists a strong interlocking action between the fiber and the matrix. To this interlocking connection is added an increase in the bonding surface area between the fiberglass and the matrix. Another advantage found in the use of the helical reinforcing fibers is that the fibers and the matrix interact with each other in such a fashion as to optimize the properties of each component of the composite.

From the standpoint of the helical fiber element, the matrix serves to stiffen the element providing it with a higher spring constant under tension loading. For compression loading the matrix coacts with the helices so that each helix acts as a column having a higher moment of inertia than a straight fiber and therefore, provides a higher compressive strength. From the standpoint of the matrix, the helical fiber provides a three-dimensional support acting somewhat like a tube so that the matrix itself is stronger and considering Poisson's ratio (lateral strain to longitudinal strain) would have a higher modulus of elasticity for both tension and compression.

Because of the helical form of the fiber 14, a larger quantity of the plastic matrix 12 interacts with each fiber both with torsional shear strain as well as tension or compression. In addition, the helical form of the element 14 permits a greater deformation of the reinforcing fiber within the elastic limit. Because of these factors, the composite is able to absorb a greater amount of energy plastically as well as elastically during tensile or compression loading. Helical fibers oriented parallel to the neutral axis of the beam or panel would increase the shear modulus and the flexural modulus by reason of the convolutions of the helical fibers obstructing the slipping of the shear planes. In contrast, a composite reinforced with straight fibers only, interfiber or interlaminar shearing stresses are resisted exclusively by the plastic matrix during bending.

Figure 3:
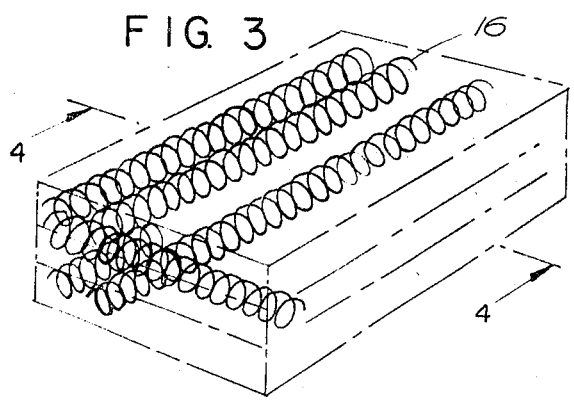
FIG. 3 is a view similar to FIG. 1 but showing a modification of the invention.
Figure 4:
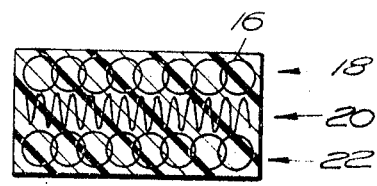
FIG. 4 is a cross sectional view taken along the line 4—4 of FIG. 3.

In FIGS. 3 and 4 there is shown a modification of the invention and in this embodiment a plurality of reinforcing helical fibers 16 are arranged in multiple levels or strata 18, 20 and 22 each stratum having parallel helical fibers partly in mesh with one another and at right angles to the fibers of an adjacent level. This arrangement provides the desired improvements in toughness in both directions of the composite.

Meshing may take place not only between the helical fibers both within a lamination but also between adjacent laminations so that the fibers reinforce one another and increase the strength of the composite in any one direction. This is done without impairing the ability of individual fibers to work independently so that a flaw in one fiber cannot be transmitted to other fibers. In the event of failure by one or more fibers, however, the interleaving of the helices helps to maintain the strength of the composite.

For meshing adjacent perpendicular fibers in the manner suggested above, the direction of winding on the helices should be of the opposite hand for the fibers that are perpendicular and the helix angle should be close to 45°. Preferably, the helical fibers should be wound with multiple strands when the helix angle is large in order to provide a higher percentage of reinforcement. In any event, when the matrix is added to the reinforcement, there is a substantial improvement in delamination resistance to loads applied across the laminations. Simple meshing of adjacent laminations provides a quick and easy method for forming a reinforcing core and may be used where more complex reinforcements are not required.

For greater resistance to delamination, however, adjacent levels of fibers may be positively interlocked. This may be done by mounting three levels of helices in spaced parallel relation with the individual helical elements of the top and bottom being in spaced parallel relation to other elements in their respective level and staggered with respect to those in the opposite level. The helical elements of the center level are at right angles to those in the top and bottom levels. All of the elements are stretched and in this stretched condition, the several layers may be brought together and the top and bottom levels transposed so that the convolutions will interlock. Tension on all of the elements is relaxed simultaneously to form the interlocked mat of FIG. 5C. This technique is illustrated in FIGS. 5A, 5B and 5C where multiple levels of fibers are axially tensioned by means of movable clamps 26 and 28. It will be understood that similar clamps are provided at each end of the network of fiberglass elements. This technique provides a woven effect between the helical elements without actual weaving. Elements to be used in this manner should have a relaxed helix angle somewhat less than 45° but perpendicular helices should be wound in the opposite hand. To achieve full interlocking between more than three plies, it is necessary to weave the fibers but this then provides a reinforcement with many laminations all positively locked together. The weaving in such case would best be done when the plies are in the condition of FIG. 5C, that is, the elements are stretched and the upper and lower plies transposed. Added plies may then be woven into the exposed outer loops of the transposed plies and then the tensions relaxed.

Figure 6:
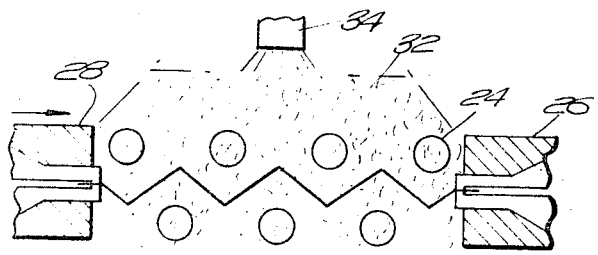
FIG. 6 is a view similar to FIG. 5B showing a felting apparatus.
Figure 6A:
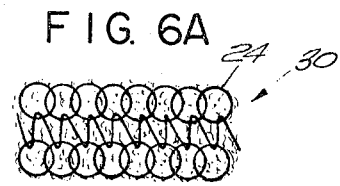
FIG. 6A is a detail end view of a reinforcing mat made by the apparatus of FIG. 6.

In order to achieve a higher packing ratio and thereby enhance the strength of the composite, glass may be added to the reinforcing mat. In the embodiment shown in FIGS. 6 and 6A, helical elements 24 are formed into an interlocked mat 30 by means of the technique of FIGS. 5A, 5B and 5C and characterized by felting 32 which is blown onto the fibers by means of a gun 34. The felting 32 preferably comprises short pieces of fiberglass filaments which, when blown onto the tensioned network, will fill up the interstices of the reinforcing helical members and when tension is released on these members, a relatively densely packed mat 30 is produced. The resulting mat contains a high percentage of glass reinforcement and forms a good core material since it offers a high resistance to interlaminar shear and delamination and is particularly suitable as a core material where lower density is desirable.

Figure 13:
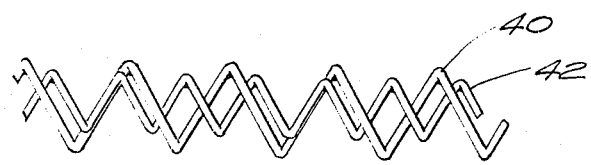
FIG. 13 is a side elevation of still another modification.
Figure 14:
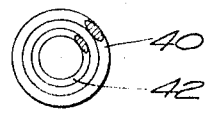
FIG. 14 is an end view thereof.

To increase the packing ratio of individual elements various techniques may be employed. For example, in FIG. 8 a bundle of straight fiberglass strands 44 form the core of a helical element 46 such as the element 39 of FIG. 7. The outer helical element may consist of more than one course. The inner reinforcing fibers may be twisted in a cable fashion or may themselves be helical elements as suggested in FIGS. 13 and 14 wherein an outer course of helical elements 40 are disposed concentrically about an inner course of helical elements 42 of a smaller diameter and preferably wound in the opposite hand. The FIG. 13 embodiment thus would have a lower tensile modulus than the FIG. 8 modification which employs a core of straight fibers. The straight core strands 44 add rigidity to the helix and prevents its collapse under load.

Individual fibers presently available are solid fibers with diameters up to .0004″ and hollow fibers up to .0007″ in diameter. In order to build these narrow strands up into helical elements of the desired diameter .015–.035″, various arrangements may be used, and thereby add to the strength of the composite. For example, in FIG. 7 there is shown a bundle of fiberglass stands 36 bound together by means of a helical fiberglass element 38 which is wrapped or served about the bundle and both of which are shaped into a helix 39. Filaments may be drawn in larger diameters with little sacrifice in strength if surface flaws can be reduced.

Figure 11:
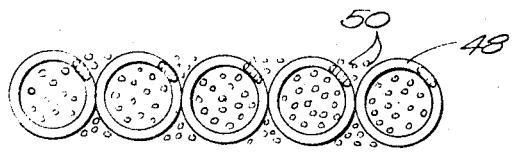
FIGS. 11 and 12 are end elevations showing further modifications of the invention.
Figure 12:
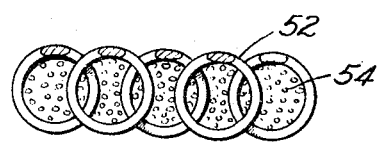

In FIGS. 11 and 12 there are illustrated two further modifications for use as the reinforcing elements. In the FIG. 11 embodiment a number of parallel, co-planar helical elements 48 are arranged in tangential relation to one another with lengths of straight fiberglass strands 50 laid between each of the elements and also extending through their centers. In FIG. 12 helical elements 52 are meshed and interlocked by means of straight helical fibers 54 extending lengthwise within each of the elements and also within the elliptical space formed by the meshing of adjacent elements 52. This latter arrangement in addition to having a positive interlocking connection between elements also provides a very strong reinforcement to the matrix.

Figure 9A:
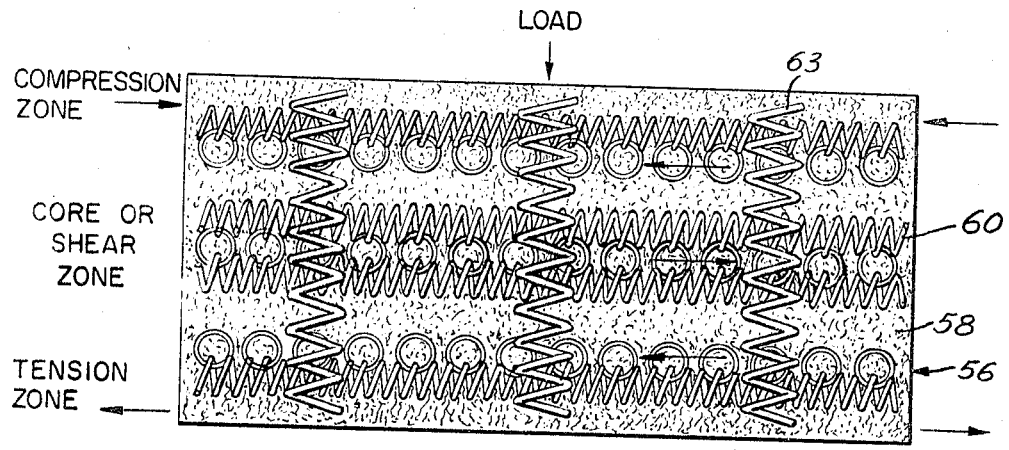
FIG. 9A is a view similar to FIG. 9 showing a modified composite.

Referring now more particularly to FIG. 9A there is shown a composite structural member 56 such as a panel, beam or the like, which includes a matrix 58 and fiberglass reinforcements 60 located in the three main stress zones, namely, the tensile, compression and shear zones. In general, a structural member such as the panel illustrated in FIG. 9A will develop three types of stresses when a load is applied in the manner suggested in the drawings. Specifically, the uppermost zone will undergo a compression stress while the lowermost zone will undergo a tensile stress due to the bending moment of the applied force. The center portion of the panel, on the other hand, will undergo shearing stresses. This is sometimes known as the neutral axis.

In the FIG. 9A embodiment, two layers of fiberglass helical reinforcing elements are located in both the compression and the tension zones near the opposing surfaces of the composite. Each layer consists of a plurality of helical elements parallel to one another with the elements of one layer arranged at 90° with respect to the other layer. Preferably, the reinforcing elements employed in the compression and tension zones are of the type shown in FIGS. 7, 8, 11, 12 or 13 while the core material employed in the shear zone preferably is a multi-level network of the sort shown in FIGS. 4, 5A or 6A with felted reinforcement or other means for increasing the percentage of reinforcement. In order to tie together the three zones and prevent delamination under buckling loads, as when a curved panel is forced inwards, helical strands 62 may be hooked across the thickness of the panel to form a seam as shown in FIG. 9. Alternatively, short helical fibers 63 (FIG. 9A) may be employed by inserting them through the several plies of reinforcing elements before curing. These, like the loops of the hooked strands of FIG. 9 will hold together the three zones and all of the plies which make up any one zone. The helical form of the strand when set into the matrix provides positive locking against delamination. Hooking with helical strands offers several advantages in that the loops form bulb-like shapes, which when set in the matrix, prevent the loops from being pulled back through the mesh of the core. The flexibility of the strands facilitates placement of the reinforcement in the mold and convolutions will normally nest where two sections meet at an interstice through which a loop is passed. This will reduce abrasion to the fibers. The hooking may be done while the network is stretched to eliminate abrading the fiberglass strands although this would not be necessary if the helical reinforcements are of steel or the like.

The use of helical fibers as reinforcing elements permits a greater elongation of the fiber before it reaches its elastic limit. This is accompanied by a reduction in the tensile modulus and a far greater level of strain energy absorption. In other words, the toughness of the composite is improved and the likelihood of catastrophic failure is substantially diminished. Dimensional stability and toughness are related quantities and while from one aspect it would appear that rigidity has been sacrificed for added toughness, the unique interaction between the helical elements and the matrix offset this theoretical reduction. Thus, while the composite tensile modulus may be reduced somewhat, the innerlaminar shear modulus and compression modulus are increased sufficiently so that the flexural modulus remains about the same or may be increased. Where the helical fibers are filled with a core of straight or twisted fibers, a higher tensile modulus is obtained.

In practice, the helical fibers may be prestressed during cure of the plastic resin matrix so that less elongation is available and rigidity is enhanced. Although this would have the effect of reducing the toughness of the composite, the helical fibers would still have the valuable effect of increasing compression and shear moduli plus an increase in the resistance to delamination.

Figure 10:
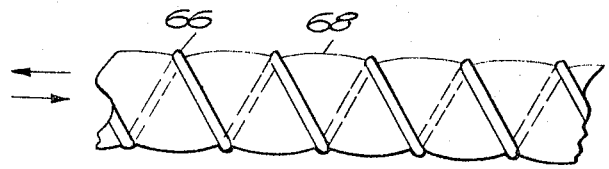
FIG. 10 is a schematic side elevation illustrating certain principles involved in the invention.

Referring now more particularly to FIG. 10, there is a view useful for illustrating the interaction between the helical reinforcing element and the matrix by considering only a more or less cylindrical section of matrix disposed within a helical element. Assuming then that in FIG. 10 the helical element 66 is tightly united to the matrix 68 and the composite is axially stretched as would be the case where the section illustrated were in a tension zone such as described in connection with the FIG. 9 composite. Under such a condition of axial stress, the element 66 would tend to be reduced in diameter while the matrix 68 would resist such reduction. On the other hand, if the composite were to be axially compressed as would be the case where the section were located in the compression zone of the FIG. 9 composite, the helix 66 would tend to collapse and to increase in diameter whereas the matrix 68 would resist such a change. The result is that the helical element, which is tubular, cooperates with the matrix to form a structure which is substantially a column having both strength, flexibility and capability of a high degree of plastic deformation. It will be understood, of course, that in any structure employing helical reinforcing elements, the axis of the helix should be arranged in the direction of the desired increase in strength and toughness. In a beam, for example, the elements should be arranged lengthwise within the matrix.

Helically shaped reinforcing elements make possible for a greater variety in the combination of materials that may work effectively together in a composite. The criteria for the two components of the composite are, first, that the reinforcement have an elastic modulus about double that of the matrix; secondly, that the elongation of the matrix be greater than that of the reinforcement at failure; and thirdly, that the temperature expansion co-efficients be compatible. Using helical reinforcing fibers, various combinations are possible; for example, spring steel reinforcing elements may be employed in plastics since the helical form offsets any problem of a differential in temperature co-efficients. Also properly oriented cylindrical helical reinforcements may be employed in rubber products such as tires, belt drives, and the like. Fiberglass reinforced plastic composites may also be used as a covering or backing for metal since the helical fibers can provide sufficient flexibility to work with the metals higher temperature expansion co-efficient. Other combinations are also possible such as carbide, sand or metal filled plastic matrices reinforced with helical elements. In tooling, for example, the helices could be oriented roughly perpendicular to the compression force. The helices would be intermeshed but would still act both as columns to resist the compressive force and as tubes to hold the matrix in the aggregate together in three dimensions; that is, resist Poisson's ratio, prevent cracking and resist fatigue. The helices here may be steel instead of glass fibers.

Figure 7:
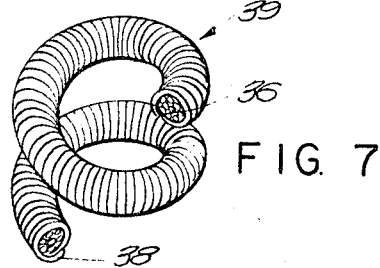
FIG. 7 is a view in perspective showing a modified reinforcing element.
Figure 8:
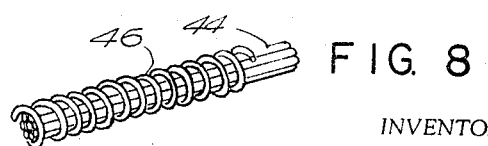
FIG. 8 is a view in perspective showing another modification of the reinforcing element.

The helical elements particularly those of fiberglass may be produced by several techniques. For example, in FIG. 15 simple filaments 70 may be drawn through a platinum die 72 and wound on a rotating heated conical spindle 74 designed so that each new turn advances the preceding turns along onto a cooled fixed cylindrical tube 76. The heated spindle softens the fiberglass so that it conforms to the spindle. When the glass cools, it retains the helical form. In practice, the glass is protected against abrasion through lubrication and preferably coated with a plastic resin. Referring again to FIG. 15, compound helical structures such as shown in FIG. 7 could be fabricated by feeding strands 78 through the hollow core of the spindle to pick up the helices as they are pushed off. For this compound helical structure a second heated spindle 80 is provided to wind up the strand-filled helix which is then heat softened and the resin cured. Upon cooling the element is fixed into the compound form of FIG. 7, where the torsional shear on the wire of the coil puts the original filaments in tension and the shear is taken in the very fine plastic film between the convolutions of the first helical elements. As an alternative measure, the turns of the first helical elements may be sintered together to form a glass tube. The FIG. 8 embodiment may be fabricated by feeding the strands 44 of FIG. 8 through the hollow center of the spindle 80 shown in FIG. 15 to pick up the convolutions of the compound helix as they are pushed from the spindle 80.

While the invention has been described with particular reference to the illustrated embodiments, it will be understood that numerous modifications thereto will appear to those skilled in the art. For example, helical elements could be used to advantage in a rubber conveyor or drive belt 84 as suggested in FIG. 16. Also a mesh of helical elements 86 could be used as reinforcement in a tire 88 as shown in FIGS. 17 and 18.

Having thus described the invention, what I claim and desire to obtain by Letters Patent of the United States is:

1. A reinforced composite structural body, comprising
    (a) a matrix, and
    (b) a plurality of resilient reinforcing elements in the form of cylindrical helices embeded in said matrix,
    (c) said elements being distributed in a plurality of superimposed groups, each group constituting a ply and the elements in one ply having their longitudinal axes parallel to one another,
    (d) a pair of plies located in the compression and tension zones of said body, the elements of one ply in a pair being at right angles to those of the other ply in the pair and
    (e) a multi-ply assembly disposed between said pairs of plies, the elements of one ply in said multi-ply assembly being oriented at right angles to the elements of the other plies.

2. A reinforced composite structural body according to claim 1 including resilient helical elements disposed transversely through said matrix for resisting delamination of said plies.

3. A reinforced composite structural body according to claim 2 wherein the transverse elements are lengths of helical strands having sections looped through the interstices of said plies.

4. A method for forming a mat of helical elements for use in reinforcing structural composites, comprising the steps of
    (a) arranging said elements in three superimposed parallel strata, the elements in the outermost strata being in coplanar parallel relation to elements in the same stratum but in staggered parallel relation with respect to elements in a different stratum, the elements in the innermost strata being in parallel coplanar relation but at right angles to elements in the outermost strata,
    (b) stretching all of said elements,
    (c) transposing the elements of the outermost strata so that their convolutions lock with those of the elements of the innermost stratum, and
    (d) relaxing all of said elements in unison to form an interlocked mat.

References Cited

UNITED STATES PATENTS

| | | | |
|---|---|---|---|
| 629,183 | 7/1899 | Allen | 161—47 X |
| 762,740 | 6/1904 | Midgley. | |
| 835,005 | 11/1906 | Allen. | |
| 1,800,179 | 4/1931 | Darrow | 161—47 X |
| 2,201,113 | 5/1940 | Neal. | |
| 2,217,826 | 10/1940 | Van Laer. | |
| 2,591,934 | 4/1952 | Hawkinson | 156—144 X |
| 2,805,180 | 9/1957 | Burr | 156—428 |
| 3,120,689 | 2/1964 | Drummond | 156—166 X |
| 3,146,155 | 8/1964 | Trenner | 161—139 |
| 2,398,237 | 4/1946 | Marsack | 267—84 XR |
| 2,671,745 | 3/1954 | Slayter. | |

FOREIGN PATENTS

| | | |
|---|---|---|
| 233,142 | 10/1944 | Switzerland. |
| 1,063,948 | 12/1953 | France. |

ROBERT F. BURNETT, *Primary Examiner.*

WILLIAM A. POWELL, *Assistant Examiner.*

U.S. Cl. X.R.

152—210, 357; 156—172, 173, 181, 425, 494; 161—53, 59, 60, 93, 96; 267—1